Nov. 17, 1959     F. FIKENSCHER     2,913,228
ROTATING REGENERATIVE AIR PREHEATER FOR EXCESSIVE AIR HEATING
Filed Aug. 7, 1952     3 Sheets-Sheet 1

Inventor:
Friedrich Fikenscher
By Watson, Cole, Grindle & Watson
ATTORNEYS

Nov. 17, 1959  F. FIKENSCHER  2,913,228
ROTATING REGENERATIVE AIR PREHEATER FOR EXCESSIVE AIR HEATING
Filed Aug. 7, 1952  3 Sheets-Sheet 3

Inventor:
Friedrich Fikenscher
By Watson, Cole, Grindle & Watson
ATTORNEYS

United States Patent Office 2,913,228
Patented Nov. 17, 1959

2,913,228

ROTATING REGENERATIVE AIR PREHEATER FOR EXCESSIVE AIR HEATING

Friedrich Fikenscher, Gummersbach, Rhineland, Germany, assignor to L. & C. Steinmüller G.m.b.H., Gummersbach, Rhineland, Germany, a German firm Application August 7, 1952, Serial No. 303,066

Claims priority, application Germany August 21, 1951

3 Claims. (Cl. 257—267)

The use of rotating regenerative air preheaters known under the name "Ljungström-preheaters" is restricted when excessive heating is required, as the quantity of the absorbed heat does not suffice for cooling the furnace gases from the high initial temperature required for the final heating of the air down to the usual end temperature determined by heat economy. For this reason the furnace gases or the like have been conducted first through the stationary final air heater consisting e.g. of pockets made of wrought iron or of cast-iron, then through a feed water preheater, and finally through a regenerative air preheater adapted to heat the air, it is true, only up to a mean air temperature but cools the furnace gases down to the required end temperature. Such arrangement requires two separate air preheating plants with complicated and space requiring connecting channels which considerably impede accessibility to the plant, especially if steam boilers are concerned.

For the purpose of avoiding such difficulties the rotating regenerative preheater is subdivided into two rotor elements separated from each other at the side of the furnace gases but arranged on one shaft in a spaced relationship, with one of said rotor elements working in the high range of temperature and the other in the low range. These two ranges of temperature are separated from each other by a temperature difference within which a portion of the heat of the furnace gases is transmitted to another cooling means, e.g. to the boiler feed water. Therefore, a feed water preheater is inserted into the path of the furnace gases between the two rotor elements, while the air channel portion provided at opposite sides of the rotor elements is uninterrupted.

The advantage of the invention consists in substantial savings in saving space; material and upkeep expenses, moreover, with many plants considerable initial cost of installation and working costs may be saved in consequence of the compact construction.

A very advantageous constructive embodiment of such air preheater consists in that the cooling surfaces producing the temperature difference are accommodated in a substantially bead-like or pocket-like enlargement of the housing connecting each two adjacent preheater stages with each other. If the usual radially arranged sector sheets are provided between each two preheater stages, the furnace gases may be conducted through these cooling surfaces e.g. by means of a separating disc rotating with the rotor at about the middle of the connecting housing.

In a corresponding way, the air can also be conducted around the separating disc through a channel provided in the enlargement of the connecting housing. If desired, a similar rotating separating disc may be provided with members adapted to be opened only in the direction of the air flow similar to check valves but closing in the direction of the furnace gas flow. In this latter case, the said channel may be dispensed with.

The additional cooling surface provided between two stages of the air preheater should be connected in parallel to an intermediate stage of an air preheater on the furnace gas side, which intermediate stage may be, under certain circumstances, considerably smaller than the preceding and the subsequent air preheater stages.

Especially the furnace gas cross section area if desired, the outer diameter of the intermediate stage of the air preheater may be decreased for the purpose of admitting the furnace gases to the additional cooling surface in a better way. With a smaller diameter of the intermediate stage of the air preheater, the additional cooling surface may be accommodated in the semi-annular space within the cylindrical air preheater housing at the side of the furnace gases, while the remaining annular space at the air side is filled by a suitable stationary displacing body and the air is conducted, in a manner already suggested, around the displacing body through a channel arranged outside the housing cylinder.

With all these adjustments, the constructing engineer may fix in advance the proportion of the absorption of heat and the furnace gas admission of the two heat absorbing surfaces (air preheater and e.g. feed water preheater) connected in parallel in the intermediate stage of the air preheater by suitably constructing and compensating for the resistances of the furnace gas flow. Moreover, the admission of furnace gases to the two cooling surfaces may be changed during the working by suitably located adjustable throttling means, of course, also any reliable automatic control may be used. Under certain circumstances, the preceding or subsequent air preheater stage may be omitted, if required.

The main idea of the invention allows the practical combination of a simultaneous connection in parallel of heating surfaces of the air preheater, the overheater and the preliminary evaporator without noticeable want of space or expenses.

The drawings illustrate some embodiments of the invention by way of example.

Figures 3, 4:
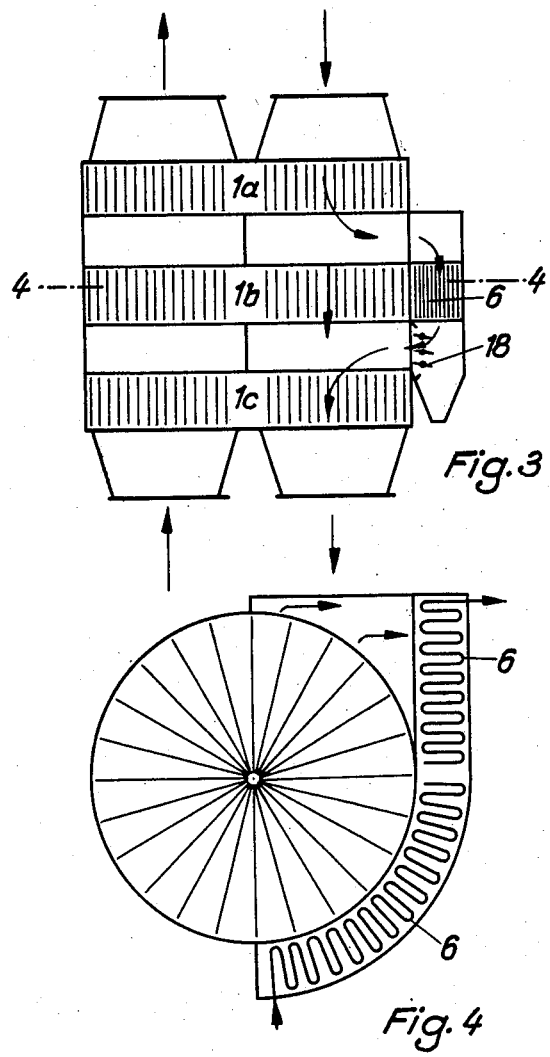
Figure 5:
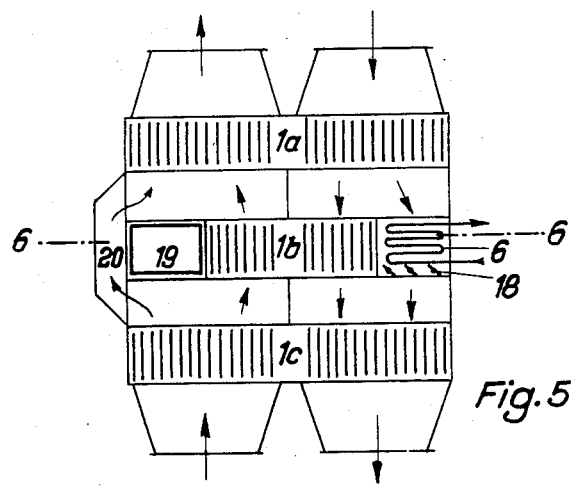
Figure 6:
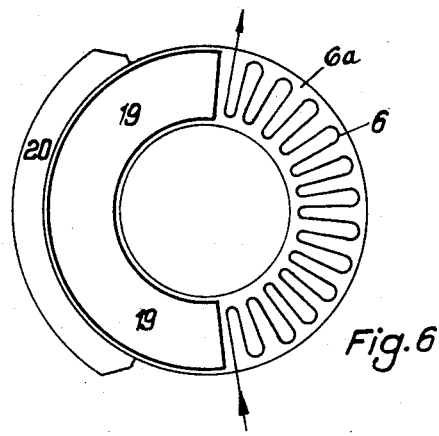

Fig. 3 is a vertical section through an air preheater having an additional cooling surface provided outside the housing cylinder, Fig. 4 is a horizontal section through Fig. 3 in the direction of line 4—4, the upper half of this figure showing a rectilinear additional cooling surface arranged tangentially to the housing cylinder and the lower half showing the additional cooling surface arranged concentrically, Fig. 5 is a vertical section through an air preheater having an additional cooling surface inserted into the annular space of the housing cylinder around the intermediate stage of the air preheater, a displacing body being provided at the air side and an air conducting channel outside the housing cylinder, and Fig. 6 is a horizontal section through Fig. 5 in the direction of the line 6—6.

Figure 1:
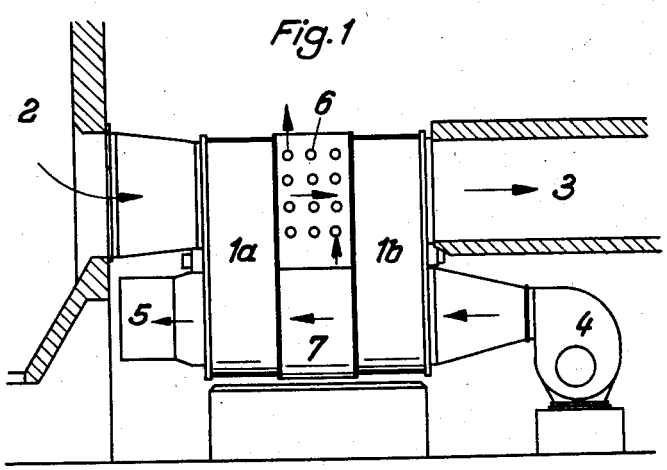
Fig. 1 shows a rotating regenerative preheater having a horizontal axis, and provided with two rotors.

The rotating regenerative preheater shown in Fig. 1 has a horizontal axis and consists of two rotor elements namely, a rotor 1a for high temperatures and a rotor 1b for low temperatures. Its upper half is passed by the furnace gases flowing from the draught 2 to the flue 3 from the left hand side to the right hand side as indicated by arrows, while the air of combustion passes through the lower half of the preheater from the ventilator 4 to the channel 5 from right to left.

The upper connecting piece between the two rotor elements passed by the furnace gases contains the feed water preheater 6, while the corresponding air space lying thereunder is free of insertions.

Figure 2:
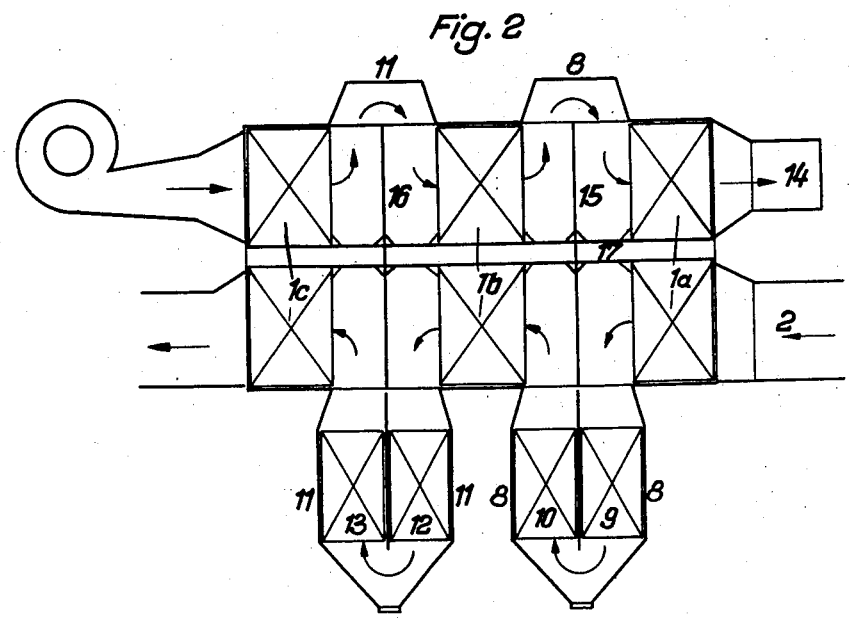
Fig. 2 shows a regenerative air preheater divided into three stages and having also a horizontal axis.

Fig. 2 shows a regenerative air preheater subdivided into three stages 1a, 1b and 1c and rotating around a horizontal axis. Of course, such air preheater may also be constructed to rotate around a vertical axis.

The furnace gases are conducted from the draught 2 to the stage 1a in the direction of the arrow and pass successively through the connecting housing 8 provided with cooling surfaces 9 and 10, the air preheating stage 1b, the connecting housing 11 with the cooling surfaces 12 and 13 and finally through the air preheating stage 1c from which they flow e.g. to the flue. The air of combustion flows successively through the air preheating stage 1c, the connecting housing 11, the stage 1b, the connecting housing 8 and finally through the air preheating stage 1a and is conducted from the latter stage to the fire space through the channel 14. The lower part of the connecting housings 8 and 11 is formed like a pocket for receiving the cooling surfaces and the upper part has a form like a bead for forming the conducting channels for the air. The separating discs 15 and 16 are fixed on the shaft 17 of the rotor.

In all figures, also in Figs. 3-6 now to be described, the air preheating stage which is first passed by the furnace gases, is designated 1a, the intermediate stage 1b and the end stage 1c. The additional cooling surface 6 is arranged in the stream of the furnace gases such wise that the quick ash may easily be eliminated.

In the embodiment shown in Figs. 3 and 4, the heat absorbing substance may be inserted into the air preheating stage 1b suchwise that, without enlarging the mass of the said substance and the contacting surface, the cross section of flow is diminished in such a degree that, with opened throttling valves 18 behind the additional cooling surface 6, the admission to that surface is considerably larger than to the stage 1b. With small load and, if required, during the starting, the possibility exists to diminish the water preheating in favor of the air preheating, by closing the throttling valves 18. Of course, the same possibility exists for the embodiment according to Fig. 5.

In Figures 5 and 6, which show the rotor elements rotating about a vertical axis it will be noted that the cooling means 6 for the furnace gases is accommodated in a portion of an annular space 6a located between the rotor elements 1a and 1c, and this annular space has the same outer diameter as that of the rotor elements 1a and 1c, with this space surrounding the intermediate rotor element 1b. As clearly indicated in Figure 6, the cooling means 6 do not completely fill the annular space 6a, but only that portion thereof through which the furnace gases pass on their path through the circular cross section of the entire rotor component. The remainder of the annular space 6a is filled by an arcuate body 19 which, for the purpose of simplicity, has been denoted a filler or displacing body. The arcuate body 19 is provided in that it functions to insure effective sealing between the furnace gas side and the combustion air side by a relatively simple means.

In this embodiment, the housing is provided with a hollow bead-like air conducting channel between the rotor elements 1a and 1c. In view of the fact that the arcuate body 19 and the space 6a in which the cooling means 6 are located define a closed annular channel having stationary insertions, the radial separating partitions of the sectors extending from element 1a to element 1c must be eliminated in element 1b.

It will be appreciated from the foregoing that one of the essential advantages of this invention resides in the fact that without noticeable increase of space and expense a simple assemblage is provided to increase the air preheating above the normal heating and independently thereof to overheat the steam to a desired degree corresponding to that with normal load and to control at will the preheating or overheating. By virtue of the arrangement of the heating surfaces it is now possible when starting to maintain only the air at a higher temperature, and with small load to maintain the temperature of the superheated steam at the degree required by the power means driven thereby without affecting the firing, as well as facilitating the firing as regards ignition and combustion. Additionally, the fluidity of the slag is materially increased in furnaces wherein the slag is drawn in a liquid state.

The invention is not to be confined to any strict conformity of the showings of the drawings, but changes or modifications may be made therein provided such changes or modifications mark no material departure from the spirit and scope of the appended claims.

What I claim is:

1. A rotary regenerative heat exchange apparatus for excessive air heating, comprising housing means, means defining passages for a flue gas and combustion air through the housing means, means for supplying hot gas and combustion air to and for withdrawing the cooled gas and heated air from the passages with the gas and air being supplied to said passages in opposite directions, a rotor component rotatably mounted within the housing means and in the paths of movement of said gas and air, said rotor component including at least two rotor elements spaced axially from each other for rotation about a common axis and adapted to be moved first through the gas passage to absorb heat from the gas and then through the air passage to impart the heat to the air, said housing means including an annular enlarged portion between each two rotor elements, means located in the gas and air passage for diverting of the flow of air and gas from an axial direction into said enlarged portions, and means in each enlarged portion in the gas passage between the rotor elements to reduce the temperature of the gas before said gas enters the second rotor element to a lower degree than that of the gas leaving the first rotor element.

2. A rotary regenerative heat exchange apparatus as claimed in claim 1, further including a shaft journalled in said housing means, said rotor elements being axially spaced from each other on said shaft and said flow diverting means including a separator disc on the shaft in each enlarged portion of the housing means.

3. A rotary regenerative heat exchange apparatus as claimed in claim 2, in which said shaft extends horizontally into said housing means.

References Cited in the file of this patent

UNITED STATES PATENTS

| 1,975,519 | Rudorf | Oct. 2, 1934 |
| 2,628,015 | Neugebauer et al. | Feb. 10, 1953 |
| 2,673,718 | Ljungstrom | Mar. 30, 1954 |
| 2,723,837 | Pennington | Nov. 15, 1955 |
| 2,803,439 | Fikenscher | Aug. 20, 1957 |

FOREIGN PATENTS

| 447,208 | Italy | Apr. 16, 1947 |
| 575,509 | Great Britain | Feb. 21, 1946 |
| 633,361 | Great Britain | Dec. 12, 1949 |
| 1,065,660 | France | of 1954 |